United States Patent
Zoso et al.

(10) Patent No.: US 7,561,076 B2
(45) Date of Patent: *Jul. 14, 2009

(54) FRONT-END METHOD FOR NICAM ENCODING

(75) Inventors: Luciano Zoso, Chandler, AZ (US); Allan P. Chin, Phoenix, AZ (US); David P. Lester, Phoenix, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 829 days.

This patent is subject to a terminal disclaimer.

(21) Appl. No.: 11/117,820

(22) Filed: Apr. 29, 2005

(65) Prior Publication Data

US 2006/0244640 A1 Nov. 2, 2006

(51) Int. Cl.
  *H03M 7/00* (2006.01)
  *H03M 1/12* (2006.01)
  *G06F 17/10* (2006.01)
  *G06F 17/17* (2006.01)

(52) U.S. Cl. .......................... 341/61; 341/155; 708/300; 708/313

(58) Field of Classification Search ................. 341/155, 341/61; 375/141, 240.27, 254, 350, 355, 375/232; 708/300, 313, 290; 327/552; 332/103; 348/441; 382/300

See application file for complete search history.

(56) References Cited

U.S. PATENT DOCUMENTS

| 4,878,188 | A | * | 10/1989 | Ziegler, Jr. | 708/300 |
| 5,043,827 | A | * | 8/1991 | Beikirch | 382/300 |
| 5,105,377 | A | * | 4/1992 | Ziegler, Jr. | 708/300 |
| 5,351,087 | A | * | 9/1994 | Christopher et al. | 348/441 |
| 6,031,431 | A | * | 2/2000 | Vinekar | 332/103 |
| 6,066,980 | A | * | 5/2000 | Daribi | 327/552 |
| 6,151,364 | A | * | 11/2000 | Ruether et al. | 375/254 |
| 6,463,110 | B1 | * | 10/2002 | Rinderknecht et al. | 375/355 |
| 6,603,816 | B1 | * | 8/2003 | Hamada et al. | 375/240.27 |
| 6,650,688 | B1 | * | 11/2003 | Acharya et al. | 375/141 |
| 6,731,706 | B1 | * | 5/2004 | Acharya et al. | 375/350 |

FOREIGN PATENT DOCUMENTS

GB 2125255 A 2/1984

\* cited by examiner

*Primary Examiner*—Jean B Jeanglaude
(74) *Attorney, Agent, or Firm*—Michael Balconi-Lamica (57) ABSTRACT

A NICAM encoding method comprises performing NICAM processing and coupling a front-end to the NICAM processing. The front-end processing operates with a system clock that is integer divisible such that the system clock can be used by both the NICAM processing and the front-end processing. The front-end processing includes a front-end input processing and a front-end output processing. The front-end input processing is coupled to an input of the NICAM processing and the front-end output processing is coupled to an output of the NICAM processing.

18 Claims, 3 Drawing Sheets

FRONT-END METHOD FOR NICAM ENCODING

BACKGROUND

The present disclosures relate to stereophonic audio encoders, and more particularly, to a NICAM encoding method.

Near-Instantaneously Companded Audio Multiplex (NICAM) encoding was developed during the early 1980's by the BBC research center. The main goals were to improve sound quality, provide multiple channels of digital sound or data, and improve ruggedness in difficult reception areas compared to other TV stereo systems, while preserving at the same time the compatibility with the existing services. NICAM 728 was first applied to the British TV system (PAL I) and later to PAL B/G and SECAM L. After examining several methods, in the late 1980's the ITU recommended the use of NICAM in countries using PAL and SECAM television systems for digital multisound transmission.

Figure 1:
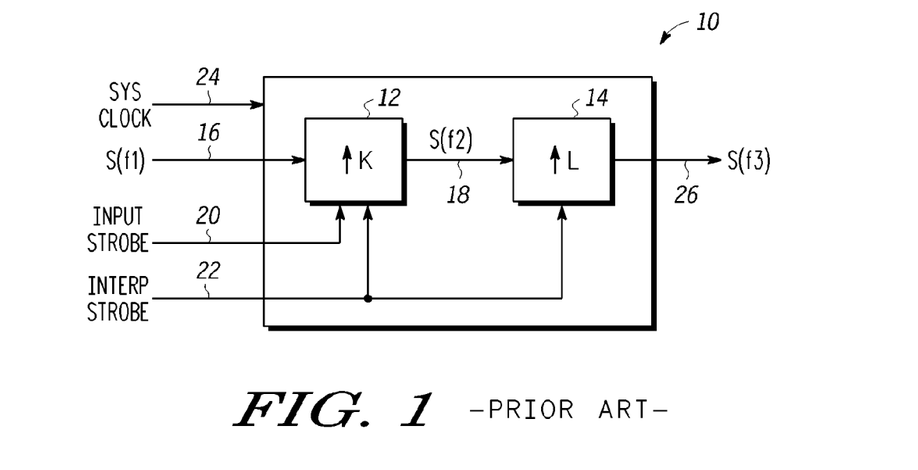
FIG. 1 is a schematic block diagram view of a prior art composite video and stereo audio system having a NICAM encoder with an analog RF modulator.

NICAM encoding is partly digital and partly analog. FIG. 1 is a schematic block diagram view of a prior art composite video with stereo audio system 10 having an analog filter 12, a dual-channel analog-to-digital converter (ADC) 14, a digital sound NICAM encoder 16, an analog QPSK transmitter 18, and an RF modulator 20. Analog filter 12 filters the two audio inputs 22 and 24, respectively, and outputs the filtered signals on outputs 26 and 28, respectively. The outputs 26 and 28 of analog filter 12 are inputs to the dual-channel ADC 14. ADC 14 receives a first clock at 34 (CLK1) and converts signals on the ADC inputs 26 and 28 into corresponding digital signals on ADC outputs 30 and 32, respectively. As illustrated, the outputs of the dual channel ADC 14 have 14-bit resolution. Digital sound encoder 16 receives a second clock at 38 (CLK2) and processes signals on encoder inputs 30 and 32 into digitally encoded signals on encoder output 36 according to the NICAM standard. Subsequently, the encoder output 36 is input to analog QPSK transmitter 18. QPSK represents Quadrature Phase Shift Keying. Analog QPSK transmitter 18 receives a third clock at 42 (CLK3) and QPSK modulates the signal received at the input 36 onto the output 40. The QPSK modulated signal on output 40 is then combined with the composite video on signal line 44 by RF modulator 20. The RF modulator then RF modulates the combined QPSK modulated signal and composite video onto RF modulator output 46.

Further in connection with the system of FIG. 1, pre-emphasis can be applied to the two inputs either in the analog or digital domain. The two input signals are digitized to 14 bit resolution at 32 kHz sample rate (CLK1) via ADC 14. The samples are grouped into blocks of thirty-two (32) 14-bit data, equivalent to a duration of 1 ms. At digital sound encoder 16, the samples of each block are companded to 10 bits with the same scaling factor. One parity bit is then added to each 10-bit sample for error detection and scale-factor signaling purposes. Left and right data are then multiplexed and bits are interleaved according to the interleaving pattern described in the NICAM standard, thus forming a block of 704 bits. Then an 8-bit frame alignment word, 5-bit control information, and 11-bit additional data are added at the beginning of the block of 704 bits, thus forming a frame of 728 bits. Each frame is serially transmitted every millisecond, for example, on signal line 36. The overall bit rate is 728 bit/s, corresponding to clock 38 (CLK2). The bitstream is then scrambled (except for the bits belonging to the frame alignment word), converted into two streams of 1-bit in-phase and quadrature data sampled at 364 kHz (symbol rate), differentially encoded and QPSK modulated, with use of clock 42 (CLK3), onto a 6.552 MHz subcarrier for PAL I or 5.85 MHz for PAL B, G and H and SECAM L via QSPK transmitter 18. The QPSK modulated audio signal 40 is then combined with the composite video 44 and RF modulated with RF modulator 20. The RF modulator produces RF signals 46 on VHF and/or UHF channels.

A disadvantage of the system of FIG. 1 is the requirement for multiple system clocks. That is, the NICAM encoder of FIG. 1 requires several clocks (e.g., CLK1, CLK2, CLK3, etc.) which are produced by different crystal oscillators and phase locked loops (PLLs). For example, for a dual-channel ADC that comprises a Sigma-Delta stereo ADC, the ADC is usually clocked at 4.096 MHz (corresponding to an oversampling rate of 128). The bit rate and symbol rate of the QPSK encoder are 728 kbit/s and 364 kbaud, respectively. The subcarrier frequency is 6.552 MHz for PAL I and 5.85 MHz for PAL B, G and H and for SECAM L. Note that these clocks are not easily related to one another, that is, they are not easily derived from a same clock, such as a 27 MHz clock or its multiples that are very common in audio/video chips or a 24 MHz clock, suitable for a single chip implementation, wherein the 24 MHz clock allows easy generation of a 4 MHz clock for the RF modulator integrated circuit. Furthermore, a disadvantage of requiring the use of PLLs is that PLLs require additional area and pins for ground and power supply. Moreover, since the crystal oscillators and PLLs are analog blocks, they are not easily portable. Accordingly, this adds extra complexity to the encoder and translates into additional overall cost.

Further as discussed above, a NICAM encoder is only partly digital. Some of its functions are implemented with analog blocks, in particular the pre-emphasis filters, the pulse-shaping filters of the QPSK transmitter and the QPSK modulator, which disadvantageously requires tuning and therefore adds considerable cost to the system. In addition, the direct implementation of these analog blocks into integrated circuits is not practical, because they are not easily portable when the technology is changed.

Still further, most of European television sets support NICAM to receive stereo audio from terrestrial television broadcasts wherever it is available. However, VCRs, DVD players, satellite set-top boxes and gaming stations are not equipped with NICAM encoders and therefore, if connected through the RF connector, only mono audio is available. Usually they are connected to television sets through a SCART connector (a.k.a. Euro connector). SCART stands for Syndicat francais des Constructeurs d'Appareils de Radio et de Télévision. Many consumer audio/video components in Europe support one or two 21-pin SCART connectors. The SCART connector has 21 pins and provides stereo sound and video signals both in and out of the equipment, depending on the particular type of equipment. In addition, the SCART connector may also provide RGB signals.

However, the SCART connector occasionally has reliability problems and sometimes, due to poor shielding, composite video output may interfere with the composite video input. Furthermore SCART cables can only be used to connect local equipment (e.g., located within the same room) and therefore cannot be used to connect remote television sets (e.g., located in distal rooms) to the set-top box. While newer European television sets are starting to include audio/video connectors similar to corresponding USA models, connecting several audio/video components, for example, to a European television set, through video, left and right audio cables can become complicated.

Traditional implementations of NICAM encoding systems are not very cost effective from the view point of integration into an audio/video chip or into a single-chip encoder due to the requirement of multiple clocks and the use of analog blocks which require tuning and which are not easily portable when integrated. NICAM encoders are generally used in TV stations and typically include very expensive rack mount units. While less costly versions may exist for other applications, the other applications still require a printed circuit board with many discrete components. Accordingly, in view of cost and complexity, NICAM encoders have been used mainly in broadcast equipment alone, and not in equipment for general consumer applications.

Accordingly, there is a need for an improved method for overcoming the problems in the art as discussed above.

BRIEF DESCRIPTION OF THE DRAWINGS

The present invention is illustrated by way of example and not limited by the accompanying figures, in which like references indicate similar elements, and in which.

The use of the same reference symbols in different drawings indicates similar or identical items. Skilled artisans will also appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION

Figure 2:
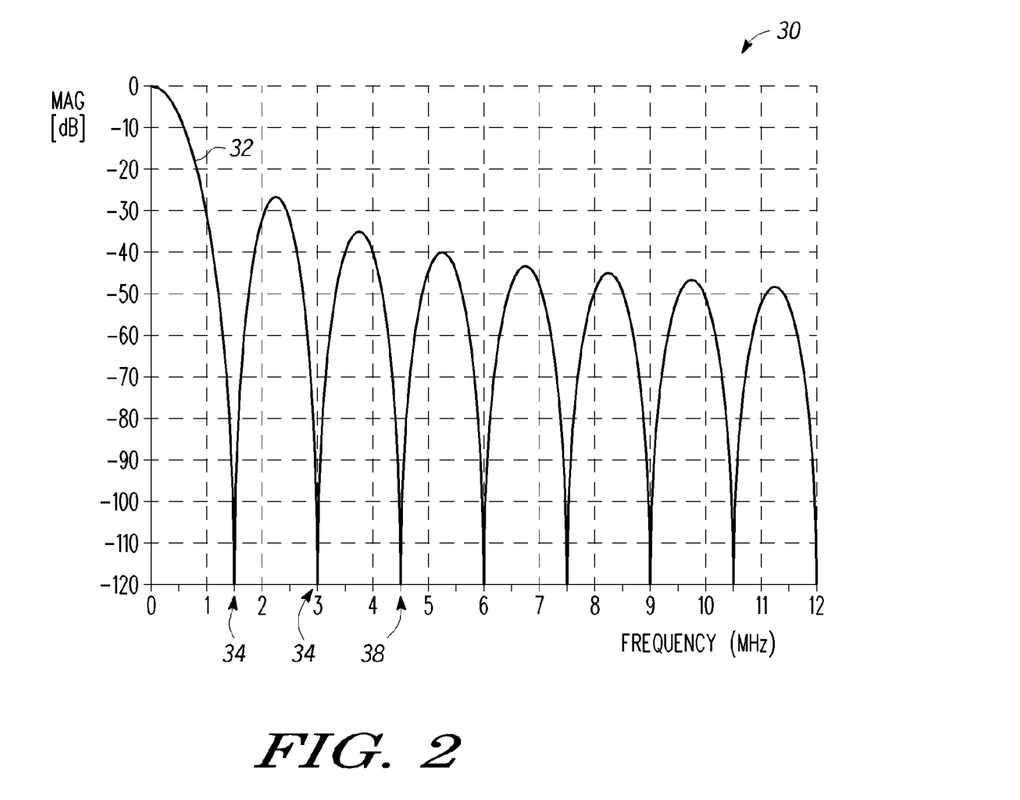
FIG. 2 is a schematic block diagram view of a composite video and dual channel audio system having a single-chip NICAM encoder for implementing a method according to one embodiment of the present disclosure.

FIG. 2 is a schematic block diagram view of a composite video and stereo audio system 50 having a NICAM encoder for implementing a method according to one embodiment of the present disclosure. The composite video and dual channel audio system 50 includes a first analog filter 52, a NICAM encoder 54, a second analog filter 56, and an analog RF modulator 58. Analog filter 52 filters two audio inputs 60 and 62, respectively, and outputs the filtered signals on outputs 64 and 66, respectively. The dual audio inputs can comprise independent A,B channels of the left and right channels of a stereo pair. In one embodiment, analog filter 52 comprises an analog anti-aliasing filter.

The outputs 64 and 66 of analog filter 52 are inputs to the NICAM encoder 54. NICAM encoder 54 receives a single clock at 68 (CLK) and converts signals on the inputs 64 and 66 into a corresponding QPSK modulated signal on output 70. In one embodiment, the clock at 68 comprises a crystal oscillator. NICAM encoder 54 also provides a clock output on signal line 72, as will be discussed further below. As illustrated, the output 70 of NICAM encoder 54 is input to the second analog filter 56. Filter 56 provides a filtered QPSK modulated signal with a carrier of 6.552 or 5.85 MHz on output signal line 74. In one embodiment, filter 56 comprises an analog reconstruction filter. The filtered QPSK modulated signal on output 74 is then combined with the composite video on signal line 76 by RF modulator 58. The RF modulator 58 then RF modulates the combined QPSK modulated signal and composite video onto RF modulator output 78 as an RF signal (UHF/VHF). RF modulator 58 further receives a clock input on signal line 72.

Figure 3:
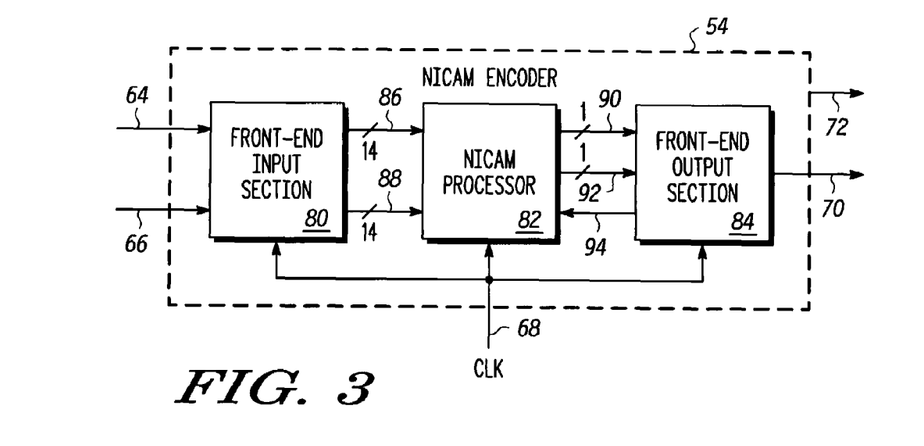
FIG. 3 is a schematic block diagram view of the NICAM encoder implementation of FIG. 2 in greater detail for implementing a method according to one embodiment of the present disclosure.

FIG. 3 is a schematic block diagram view of the NICAM encoder implementation of FIG. 2 in greater detail for implementing a method according to one embodiment of the present disclosure. The NICAM encoder 54 includes a front-end input section 80, a NICAM processor 82, and a front-end output section 84. As discussed above, NICAM encoder 54 includes inputs 64 and 66, receives a single clock at 68 (CLK). In one embodiment, the clock output on signal line 72 is derived from the clock input on signal line 68 (CLK), for example, using suitable integer dividers. NICAM encoder 54 converts signals on the inputs 64 and 66 into a corresponding QPSK modulated signal on output 70. Accordingly, the front-end of NICAM encoder 54 comprises the front-end input section 80 and the front-end output section 84.

Responsive to data signals on inputs 64 and 66, as well as in response to clock input 68, the front-end input section processes the inputs into signals, for example, 14-bit data at 32 kHz, on output lines 86 and 88, respectively. The outputs 86 and 88 of front-end input section 80 correspond to respective inputs to NICAM processor 82. Responsive to the signals on inputs 86 and 88, as well as in response to clock input 68 and a processor strobe on signal line 94, the NICAM processor processes the inputs into in-phase (I) and quadrature (Q) single-bit data stream signals on output lines 90 and 92, respectively. In other words, NICAM processor 82 accepts the samples generated at 32 kHz by the front-end input section 80. NICAM processor then performs digital companding on the inputs 86 and 88, respectively, and produces scrambled and differentially encoded in-phase (I) and quadrature (Q) data, sampled at 364 kHz in compliance with the NICAM standard, on outputs 90 and 92, respectively. It is noted that the functionality of the NICAM processor is known in the art and thus only briefly described herein. Additionally, the outputs 90 and 92 of the NICAM processor 82 correspond to respective inputs to the front-end output section 84. Responsive to in-phase (I) and quadrature (Q) single-bit data stream signals on inputs 90 and 92, as well as in response to clock input 68, the front-end output section 84 processes the inputs into a corresponding QPSK modulated signal on output 70. Furthermore, front-end output section 84 generates the processor strobe on signal line 94. Additional discussion of the front-end input section 80 and the front-end output section 84 is provided further herein below.

With reference again to the NICAM processor 82, the processor processes the 14-bit samples generated at 32 kHz by the input section 80 of the front-end and produces in-phase and quadrature data sampled at 364 kHz in compliance with the NICAM standard. In particular, the NICAM processor 82 performs the following operations: computation of scale factors, companding of 14-bit incoming data to 10-bit resolution, computation of parity bits, encoding of parity bits with scale factors, bit interleaving, generation of 728-bit bitstream, scrambling, conversion of bitstream into two streams of 1-bit in-phase and quadrature data and differential encoding. The processor 82 outputs a bit pair every time it receives a strobe from an interpolator timing circuit 138 of the front-end output section 84, as discussed further herein with respect to FIG. 5.

Figure 4:
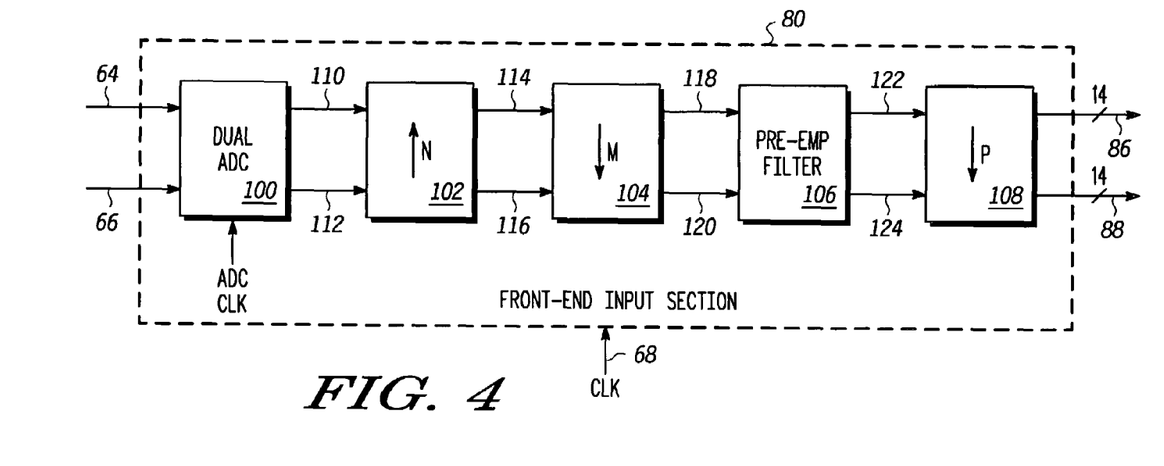
FIG. 4 is a schematic block diagram view of the front-end input section of FIG. 3 in greater detail for implementing a method according to one embodiment of the present disclosure.

FIG. 4 is a schematic block diagram view of the front-end input section 80 of FIG. 3 in greater detail for implementing a method according to one embodiment of the present disclosure. Front-end input section 80 includes dual-channel ADC 100, interpolator 102 with an interpolation factor N, first decimator 104 with a decimation factor M, digital pre-emphasis filter 106, and a second decimator 108 with a decimation factor P. The second decimator 108 generates 14-bit data sampled at 32 kHz (as specified by the NICAM standard) on output signal lines 86 and 88, respectively. In one embodiment, the dual-channel ADC 100 comprises a Sigma-Delta ADC. In addition, the clock input (ADC CLK) to the dual-channel ADC 100 is derived from the clock input on signal line 68 (CLK), for example, using suitable dividers. Furthermore, the factors N, M and P of the front-end input section 80 allow sufficient flexibility to enable the generation of the required 32 kHz from a variety of system clocks, as will be discussed further herein.

Figure 5:
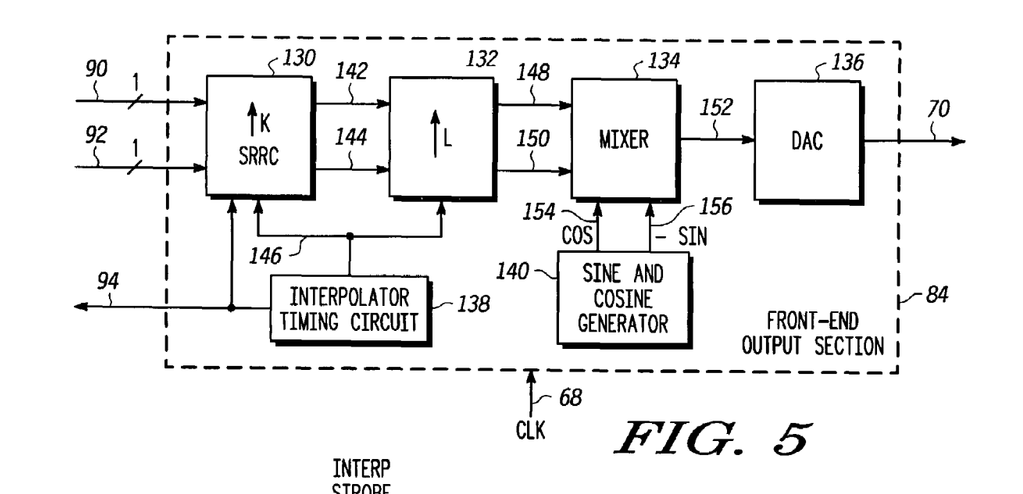
FIG. 5 is a schematic block diagram view of the front-end output section of FIG. 3 in greater detail for implementing a method according to one embodiment of the present disclosure.

FIG. 5 is a schematic block diagram view of the front-end output section 84 of FIG. 3 in greater detail for implementing a method according to one embodiment of the present disclosure. Front-end output section 84 includes digital square-root raised-cosine (SRRC) filter 130 with interpolation factor K, interpolator 132 with variable interpolation factor L, digital mixer 134, digital-to-analog converter (DAC) 136, interpolator timing circuit 138, and sine & cosine generator 140. In one embodiment, interpolator timing circuit 138 provides output strobes for the NICAM processor 82, SRRC filter 130, and interpolator 132 on signal lines 94 and 146 as shown in FIG. 5. In addition, sine & cosine generator 140 provides cosine and minus sine output signals on signal lines 154 and 156, respectively. Accordingly, the front-end output section 84 comprises means to approximate a 728 kHz clock with a clock based on the system clock 68. Furthermore, in one embodiment, DAC 136 comprises a bandpass Sigma-Delta DAC.

In one embodiment of the present disclosure, all NICAM clocks can be derived from a single system clock with suitable integer dividers. In the single-chip version, the system clock can be generated by a crystal oscillator. Accordingly, no PLL is required.

Referring still to FIG. 5, responsive to the signals on inputs 90 and 92, as well as in response to the strobes on clock inputs 94 and 146, the SRRC filter 130 with interpolation factor K is configured to perform pulse-shaping as specified by the NICAM specification, in addition to interpolating the signals by a factor K, as discussed further herein below. The outputs 142 and 144 of the SRRC filter correspond to inputs 142 and 144 of interpolator 132. Responsive to signals on the inputs 142 and 144, as well as in response to the strobe on clock input 146, interpolator 132 upsamples the input signals with a variable interpolation factor L, enabling the in-phase and quadrature SRRC output data signals to be interpolated up to the frequency of the system clock 68 on outputs 148 and 150, respectively. In one embodiment, the frequency is 24 MHz suitable for a single chip implementation. In another embodiment, where the encoder is embedded in an audio/video chip, the frequency is 27 MHz.

The outputs 148 and 150 of interpolator 132 correspond to inputs 148 and 150 of mixer 134. Responsive to signals on the inputs 148 and 150, further in response to cosine and minus sine signals on signal lines 154 and 156, respectively, mixer 134 multiplies the in-phase and quadrature data on inputs 148 and 150 by the cosine and minus sine signals to generate either a 6.552 or 5.85 MHz carrier sampled at the frequency of the system clock 68, wherein the carrier is selected according to a particular TV system implementation. Mixer 134 then adds the products to produce a digital QSPK modulated signal sampled at the frequency of the system clock 68 on output 152. The output 152 of mixer 134 corresponds to the input 152 of DAC 136. Responsive to a signal on input 152, DAC 136 converts the digital QSPK modulated signal into the analog domain and outputs the converted signal on output 70. In one embodiment, the DAC 136 samples the digital QPSK modulated signal at the frequency of the system clock 68 and includes a noise shaping notch located at either 6.552 or 5.85 MHz.

Figure 6:
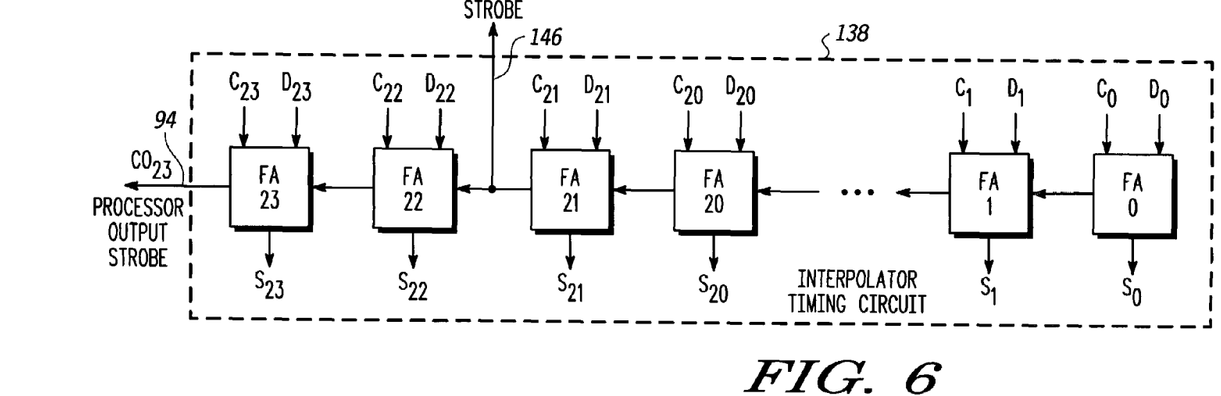
FIG. 6 is a schematic block diagram view of an illustrative interpolator timing circuit of FIG. 5 in greater detail according to one embodiment of the present disclosure.

FIG. 6 is a schematic block diagram view of an illustrative interpolator timing circuit 138 of FIG. 5 in greater detail for implementing a method according to one embodiment of the present disclosure. The interpolator timing circuit 138 generates the output strobe for the NICAM processor 82 and provides the same on signal line 94. In addition, interpolator timing circuit 138 generates the output strobe for the SRRC filter 130 and the interpolator 132 and provides the same on signal line 146. In one embodiment, interpolator timing circuit 138 includes an N-bit adder that comprises full adders, wherein N is a number of bits. As illustrated in FIG. 6, the N-bit adder includes a 24 bit adder of full adders FA0, FA1, ..., FA20, FA21, FA22, and FA23. The processor output strobe 94 corresponds to the MSB Full-adder carry-out ($CO_{23}$). In addition, the interrupt strobe 146 corresponds to the MSB-2 Full-adder carry-out ($CO_{21}$). Timing circuit 138 may also include one or more suitable accumulators and/or registers.

The embodiments of the present disclosure solve one of the single-chip implementation issues discussed herein above by using a front-end section (input and output sections (80,84)) with a single system clock 68. In addition, the front-end section is entirely digital, with the exception of the anti-aliasing and reconstruction filters 52 and 56, respectively, the dual ADC 100, and an output buffer of DAC 136. In one embodiment, the system clock frequency is 24 MHz which is produced directly by a crystal oscillator and all other clocks are derived from this system clock 68 with integer dividers. Accordingly, no PLL is needed. A single-chip implementation of the NICAM encoder is shown in FIG. 3. In an alternate embodiment, the front-end sections (80,84) and NICAM processor 82 can also be embedded in an audio/video integrated circuit chip.

In one embodiment, the front-end input section 80 and output sections 84 are clocked with an input section system clock and output section system clock. These two clocks can be the same or can be derived from the same clock with a divider. In addition, the NICAM processor 82 can use either clock.

Referring again to FIGS. 2, 3 and 4, prior to being input to the front-end input section 80, the signals (60,62) are lowpass filtered by analog anti-aliasing filter 52 and then digitized by the dual-channel ADC 100 sampled with the ADC clock (ADC CLK). The resolution and the sampling frequency of the ADC 100 of the front-end input section 80 must be selected in such a manner as to guarantee an accuracy of 14 bits at the output of the last decimator 108.

The ADC output (110, 112) is interpolated at interpolator 102 by a factor N and decimated at the first decimator 104 by a factor M. The factors N and M are selected in order that the sampling rate so obtained is at least 3 times the sampling rate of 32 kHz. In this manner, the mapping of the analog pre-emphasis filter into the digital domain produces a digital filter 106 that more accurately matches the characteristics of the corresponding analog filter specified by the NICAM standard. In one embodiment, the pre-emphasis filter 106 is implemented with a recursive filter. The output of the pre-emphasis filter 106 is decimated at the second decimator 108 by a factor P. In addition, the combination of factors N, M and P are selected in order that the output of the second decimator produces a signal sampled exactly at 32 kHz in accordance with the NICAM standard.

In one embodiment, the system clock 68 is 24 MHz (FIG. 2). In addition, the embodiments of the present disclosure enable the use of the same clocks for the dual-channel ADC 100 and DAC 136. Furthermore, the system clock 68 is also used to generate a clock of 4 MHz on signal line 72 for the RF modulator 58, thus simplifying the NICAM encoder system by avoiding the use of a second crystal. The 24 MHz system clock is generated directly by a crystal oscillator and all the other clocks are derived directly from this system clock with integer dividers. Accordingly, no PLL is needed.

In one embodiment, the ADC clock frequency (ADC CLK) is 6 MHz and interpolation factor N=2 for interpolator 102, thus producing a sampling frequency of 12 MHz at the output of the interpolator 102 (FIG. 4). In an alternate embodiment, the interpolation could be avoided by using an ADC clocked directly at 12 MHz. The first decimator 104 decimates by a factor M=75, thus lowering the sampling rate to 160 kHz. Note that such a sampling rate is 5 times higher than the final sampling rate of 32 kHz and therefore it is high enough to guarantee a good mapping of the corresponding analog filter into the digital domain. The factor P of the second decimator 108 is 5. With the selected choice of interpolation and decimation factors as noted above, it is possible to start from a sampling frequency of 6 MHz and reach the final sampling frequency of 32 kHz in compliance with the NICAM standard, deriving with dividers all the clocks from the single system clock of 24 MHz.

In another embodiment, the NICAM encoder 54 is embedded in an audio/video integrated circuit chip, wherein the clock for the front-end section (80,84) is selected to be 108 MHz (i.e., 4×27 MHz). The dual-channel ADC 100 can be clocked at 6.75 MHz (i.e., (108÷16) MHz). The interpolation-factor N is selected to be 16 for interpolator 102, thus producing a sampling rate of 108 MHz. In an alternate embodiment, with a faster ADC 100 running at 13.5 MHz, the interpolation factor N could be reduced to 8 for interpolator 102. The decimator factor M is 675 for decimator 104. In this manner, the pre-emphasis filter 106 is sampled at 160 kHz as before. In addition, the pre-emphasis filter 106 and the circuitry following the pre-emphasis filter 106 are similar to that as described in the previous embodiment.

Accordingly, the factors N, M and P introduce enough flexibility to generate the 32 kHz from a variety of system clocks.

In connection with the front-end output section 84 (FIGS. 3, 5 and 6), the problem of generating sampling rates of 728 (bit rate) or 364 kHz (symbol rate) is more complicated than that for the clocks of the front-end input section 80. This is because, unfortunately, the numbers 728 and 364 contain prime numbers 7 and 13. The prime numbers 7 and 13 make it very difficult to synthesize 728 or 364 from available system clocks, that is, unless a system designer is willing to accept extremely high system clocks on the order of higher than 300 MHz.

One solution to the problem discussed in the previous paragraph consists in generating from the available front-end system clock a clock which only on an average has a value of 728 or 364 kHz. In other words, the number of system clock cycles contained in each cycle of 728 or 364 kHz is not constant, but varies slightly from cycle to cycle. This means also that the duration of each symbol varies slightly. In one embodiment, the system clock is 24 MHz and the jitter introduced on the symbol rate is on the order of one cycle of system clock, or about 1.5% of the symbol period and will not adversely affect the overall system performance.

The NICAM processor 82 produces 364 in-phase and 364 quadrature data in every 1 ms frame, provided on signal lines 90 and 92, respectively. While the 1-bit in-phase and quadrature streams are computed correctly, they are not output with the ideal 364 kHz clock. As previously discussed, the 364 kHz clock cannot be easily derived with an integer divide from the system clock. Instead, an approximated clock whose edges coincide with the edges of the system clock is used.

An illustrative timing circuit 138 that can generate the output strobes (94,146) for the NICAM processor 82 and the interpolators (130,132) is shown in FIG. 6. The increment (Δ) for the accumulator is given by:

$$\Delta = \text{ROUND}\,(2^{N}*\text{symbol rate/system clock frequency}) \quad \text{(EQ-1)}$$

Since the increment before rounding is not an integer number, the strobes would occur at slightly different times every 1 ms frame compared with the timing produced by the front-end input section 80. This would make it difficult to synchronize the front-end input section 80 and NICAM processor 82 with the front-end output section 84. However, this problem can be solved by resetting the register of the interpolator timing circuit 138 at regular intervals m. These intervals are equivalent to the times when the register contents would assume the value zero in a floating point implementation or close to zero in a practical fixed point implementation.

In the case of a system clock of 24 MHz, the interval m is determined by:

$$m = k*\text{system clock/symbol rate} \quad \text{(EQ-2)}$$

where k is an integer number chosen in such a way that m is integer.

For instance, in the case of a system clock of 24 MHz, (EQ-2) becomes:

$$m = k*6000/91 \quad \text{(EQ-3)}$$

and k is 91 or a multiple of 91. Therefore the register can be reset at intervals equivalent to 6,000 cycles of the 24 MHz clock or a multiple of 6,000.

The SRRC filter 130 (FIG. 5) is a digital version of the pulse-shaping filter specified by the NICAM specification. According to the NICAM specification, there are two requirements: one for the PAL I system and another for all the remaining PAL and SECAM systems. In one embodiment, the SRRC filter 130 is implemented with an in-phase and quadrature finite impulse response (FIR) filter. Besides shaping the data, the SRRC filter 130 also interpolates the signals by a factor K.

In one embodiment, the system clock 68 is 24 MHz and the value of K is 4 and the in-phase and quadrature SRRC outputs on signal lines 142 and 144, respectively, are produced at an approximated sampling rate of 1.456 MHz. The SRRC filter 130 is followed by an interpolator 132 which upsamples the signals with a variable interpolation factor L. For a system clock of 24 MHz and an SRRC interpolation factor of K=4, the average interpolation introduced by the variable interpolator 132 is (24/1.456)=16.48351648. During a frame of 1 ms, the interpolator 132 interpolates 752 times by 16 and 704 times by 17. In other words, for a system clock 68 equal to 24 MHz and an SRRC interpolation K equal to 4, then the number of system clock cycles 68 in a quarter symbol period equals 16 or 17. This means that by design, the SRRC clock has a jitter of 41.666 ns (one cycle of 24 MHz). Accordingly, this allows interpolating of the SRRC output signal up to 24 MHz. Mixer 134 then multiplies the in-phase and quadrature data times the cosine and minus sine outputs of the sine & cosine generator 140. As previously mentioned, sine & cosine generator 140 can generate a 6.552 or 5.85 MHz carrier sampled at 24 MHz, according to the needs of the TV system selected. The products are then added, thus producing a digital QPSK modulated signal sampled at 24 MHz on signal line 152. The digital QPSK modulated signal is then converted into the analog domain by DAC 136 sampled at 24 MHz, further whose noise shaping notch is located at 6.552 or 5.85 MHz.

In another embodiment, the system clock 68 is 27 MHz and K=4. As in the previous embodiment, the SRRC filter 130 produces in-phase and quadrature outputs interpolated approximately at 1.456 MHz. The variable interpolator 132 interpolates the signal to 27 MHz. The average interpolation is now (27/1.456)=18.54395604. During a frame of 1 ms, the interpolator 132 interpolates 664 times by 18 and 792 times by 19. Accordingly, this allows interpolating of the SRRC output signal up to 27 MHz. The in-phase and quadrature data are respectively multiplied times the cosine and minus sine output of a sine & cosine generator 140, which can generate a 6.552 or 5.85 MHz carrier sampled at 27 MHz according to the needs of the TV system selected. The products are then added, thus producing a digital QPSK modulated signal sampled at 27 MHz on signal line 152. The digital QPSK modulated signal is then converted into the analog domain by DAC 136 sampled at 27 MHz.

In one embodiment, DAC 136 comprises a Sigma-Delta DAC. The Sigma-Delta DAC includes a noise shaping notch located at t.552 or 5.85 MHz. In addition, the Sigma-Delta DAC output is bandpass filtered by an analog reconstruction filter.

As discussed herein, the embodiments of the present disclosure provide for reduction of a number of several system clocks down to a single clock, reduced overall costs of system implementation, and replacement of a number of analog blocks with suitable digital implementations. In addition, the embodiments further solve problems in the art by enabling the equipping of VCRs, DVD players, decoders, set-top boxes and other audio/video applications with NICAM encoders according to the present disclosure. In fact, since NICAM encoders in conjunction with RF modulators can provide composite video and TV-quality stereo sound through a single RF connector instead of the 21-pin SCART connector or the three audio/video connectors (video, left audio and right audio), the NICAM encoders can be employed in DVD players, stereo VCRs, set-top boxes, gaming stations and stand-alone units, thus simplifying the typical home entertainment wiring architecture and also allowing the same to connect to remote television sets. By using equipment with built-in NICAM encoders according to the embodiments of the present disclosure, a number of audio/video applications can be connected via coaxial cable to a set-top box and receive stereo audio. Furthermore, the typical home entertainment wiring can be greatly simplified.

The embodiments of the present disclosure enable encoders to be produced at a low price. Accordingly, this enables NICAM encoders to become widely used in consumer electronics applications. Furthermore, the embodiments of the present disclosure address this issue by incorporating a front-end that enables a much more cost effective implementation of NICAM encoders than previously known.

According to one embodiment, a NICAM encoding method comprises: performing NICAM processing; and coupling front-end processing to the NICAM processing, wherein the front-end processing synchronizes the front-end processing and the NICAM processing with timing derived from integer divisions of a single system clock. In one embodiment, the NICAM processing operates at a sampling frequency of 728 kHz or 364 kHz. The front-end processing comprises front-end input processing that has an output at a sampling frequency of 32 kHz and front-end output processing that has an output at a sampling frequency of one of 24 MHz or 27 MHz.

In another embodiment, the front-end processing comprises a front-end input processing and a front-end output processing. The front-end input processing couples to an input of the NICAM processing and the front-end output processing couples to an output of the NICAM processing.

According to another embodiment, the front-end input processing comprises use of an interpolator by factor N, a first decimator by factor M, a pre-emphasis filter, and a second decimator by factor P, wherein the interpolator couples to the first decimator, the first decimator couples to the pre-emphasis filter, and the pre-emphasis filter couples to the second decimator. Alternatively, the front-end input processing comprises use of a dual-channel analog-to-digital converter (ADC), an interpolator by factor N, a first decimator by factor M, a pre-emphasis filter, and a second decimator by factor P, wherein the ADC couples to the interpolator, the interpolator couples to the first decimator, the first decimator couples to the pre-emphasis filter, and the pre-emphasis filter couples to the second decimator. In connection with the two previously mentioned embodiments, the quantity (N/(M*P)) is equal to a ratio of 32 kHz to the system clock. In addition, the dual-channel ADC includes an initial resolution of better than 14 bits and provides an output of the front-end input processing with a resolution of 14 bits. Still further, the pre-emphasis filter operates at a frequency greater than 32 kHz.

According to yet another embodiment, the front-end output processing comprises use of a digital square-root raised-cosine (SRRC) filter with interpolation factor K, a variable interpolator with variable interpolation factor L, a digital mixer, a digital-to-analog converter (DAC), and a sine & cosine generator, wherein the SRRC filter couples to the variable interpolator, the variable interpolator couples to the mixer, and the mixer couples to the DAC and to the sine & cosine generator. The front-end output processing further comprises use of an interpolator timing circuit, wherein the interpolator timing circuit couples to the SRRC filter, the variable interpolator, and the NICAM processing, further wherein the interpolator timing circuit provides strobes to the NICAM processing, the SRRC filter, and variable interpolating with the variable interpolator. Furthermore, the strobe to the NICAM processing approximates one of a 728 kHz or 364 kHz clock derived from the system clock.

In a further embodiment of the NICAM encoding method, the interpolator timing circuit generates a first strobe signal for the NICAM processing and the SRRC filtering and generates a second strobe signal for the SRRC filtering and the variable interpolating. In one embodiment, the interpolator timing circuit includes an N-bit adder that comprises full adders, wherein N is a prescribed number of bits. Furthermore, the N-bit adder includes a 24 bit adder of full adders (FA0, FA1, ..., FA20, FA21, FA22, and FA23). Still further, the first strobe signal corresponds to a MSB Full-adder carry-out (CO23) and the second strobe signal corresponds to a MSB-2 Full-adder carry-out (CO21).

According to yet another embodiment of the NICAM encoding method, the interpolator timing circuit provides a strobe for synchronizing the NICAM processing with the front-end output processing by resetting an interpolator timing circuit register of the interpolator timing circuit at regular intervals.

Still further, in another embodiment of the NICAM encoding method, the SRRC filtering with interpolation factor K comprises a pulse shape filtering portion and an interpolating portion, further wherein the pulse shape filtering portion and the interpolating portion are performed individually or as a single combined function. In yet another embodiment, the NICAM processing and the front-end processing are performed via a single integrated circuit chip implementation. Yet in a still further embodiment, the NICAM processing and the front-end processing are embedded within an audio/video integrated circuit.

In the foregoing specification, the disclosure has been described with reference to the various embodiments. However, one of ordinary skill in the art appreciates that various modifications and changes can be made without departing from the scope of the present embodiments as set forth in the claims below. Accordingly, the specification and figures are to be regarded in an illustrative rather than a restrictive sense, and all such modifications are intended to be included within the scope of the present embodiments. For example, one embodiment of the present disclosure includes stereophonic audio encoders used for audio/video consumer electronics. The embodiments further include a NICAM encoder with a front-end that comprises a single-chip NICAM encoder. The embodiments of the present disclosure still further comprise an integrated circuit that includes the NICAM encoder with a front-end as discussed herein.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the term "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A NICAM encoding method comprising:
   performing NICAM processing; and
   coupling front-end processing to the NICAM processing, wherein the front-end processing synchronizes the front-end processing and the NICAM processing with timing derived from integer divisions of a single system clock, wherein the front-end processing comprises a front-end input processing and a front-end output processing, the front-end input processing being coupled to an input of the NICAM processing and the front-end output processing being coupled to an output of the NICAM processing, and wherein the front-end input processing comprises one of:
   (a) use of an interpolator by factor N, a first decimator by factor M, a pre-emphasis filter, and a second decimator by factor P, wherein the interpolator couples to the first decimator, the first decimator couples to the pre-emphasis filter, and the pre-emphasis filter couples to the second decimator, or
   (b) use of a dual-channel analog-to-digital converter (ADC), an interpolator by factor N, a first decimator by factor M, a pre-emphasis filter, and a second decimator by factor P, wherein the ADC couples to the interpolator, the interpolator couples to the first decimator, the first decimator couples to the pre-emphasis filter, and the pre-emphasis filter couples to the second decimator.

2. The NICAM encoding method of claim 1, wherein the NICAM processing operates at a sampling frequency of 728 kHz or 364 kHz, and wherein the front-end processing comprises a front-end input processing that has an output at a sampling frequency of 32 kHz and a front-end output processing that has an output at a sampling frequency of one of 24 MHz or 27 MHz.

3. The NICAM encoding method of claim 1, further wherein the NICAM processing and the front-end processing are embedded within an audio/video integrated circuit.

4. The NICAM encoding method of claim 1, further comprising:
   using a first analog filter coupled to an input of the front-end processing, wherein the first analog filter comprises an anti-aliasing filter; and
   using a second analog filter coupled to an output of the front-end processing, wherein the second analog filter comprises a reconstruction filter.

5. The NICAM encoding method of claim 1, further wherein the quantity (N/(M*P)) is equal to a ratio of 32 kHz to the system clock.

6. The NICAM encoding method of claim 1, further wherein the dual-channel ADC includes an initial resolution of better than 14 bits and provides an output of the front-end input processing with a resolution of 14 bits.

7. The NICAM encoding method of claim 1, further wherein the pre-emphasis filter operates at a frequency greater than 32 kHz.

8. The NICAM encoding method of claim 1, wherein the front-end output processing comprises use of a digital square-root raised-cosine (SRRC) filter with interpolation factor K, a variable interpolator with variable interpolation factor L, a digital mixer, a digital-to-analog converter (DAC), and a sine & cosine generator, wherein the SRRC filter couples to the variable interpolator, the variable interpolator couples to the mixer, and the mixer couples to the DAC and to the sine & cosine generator.

9. The NICAM encoding method of claim 8, wherein the front-end output processing further comprises use of an interpolator timing circuit, wherein the interpolator timing circuit couples to the SRRC filter, the variable interpolator, and the NICAM processing, further wherein the interpolator timing circuit provides strobes to the NICAM processing, the SRRC filter, and variable interpolating with the variable interpolator.

10. The NICAM encoding method of claim 9, further wherein the strobe to the NICAM processing approximates one of a 728 kHz or 364 kHz clock derived from the system clock.

11. The NICAM encoding method of claim 9, further wherein the interpolator timing circuit generates a first strobe signal for the NICAM processing and the SRRC filtering and generates a second strobe signal for the SRRC filtering and the variable interpolating.

12. The NICAM encoding method of claim 11, wherein the interpolator timing circuit includes an N-bit adder that comprises full adders, wherein N is a prescribed number of bits.

13. The NICAM encoding method of claim 12, further wherein the N-bit adder includes a 24 bit adder of full adders (FA0, FA1, . . . , FA20, FA21, FA22, and FA23).

14. The NICAM encoding method of claim 13, further wherein the first strobe signal corresponds to a MSB Full-adder carry-out (CO23) and the second strobe signal corresponds to a MSB-2 Full-adder carry-out (CO21).

15. The NICAM encoding method of claim 9, further wherein the interpolator timing circuit provides a strobe for synchronizing the NICAM processing with the front-end output processing by resetting an interpolator timing circuit register of the interpolator timing circuit at regular intervals.

16. The NICAM encoding method of claim 8, wherein the SRRC filtering with interpolation factor K comprises a pulse shape filtering portion and an interpolating portion, further wherein the pulse shape filtering portion and the interpolating portion are performed individually or as a single combined function.

17. The NICAM encoding method of claim 1, further wherein the NICAM processing and the front-end processing are performed via a single integrated circuit chip implementation.

18. A NICAM encoding method comprising:
   performing a front-end input processing, wherein the front-end input processing comprises one of:
   (a) use of an interpolator by factor N, a first decimator by factor M, a pre-emphasis filter, and a second decimator by factor P, wherein the interpolator couples to the first decimator, the first decimator couples to the pre-emphasis filter, and the pre-emphasis filter couples to the second decimator, or
   (b) use of a dual-channel analog-to-digital converter (ADC), an interpolator by factor N, a first decimator by factor M, a pre-emphasis filter, and a second decimator by factor P, wherein the ADC couples to the interpolator, the interpolator couples to the first decimator, the first decimator couples to the pre-emphasis filter, and the pre-emphasis filter couples to the second decimator;

performing NICAM processing, the front-end input processing being coupled to an input of the NICAM processing; and performing front-end output processing, the NICAM processing being coupled to an input of the front-end output processing, wherein the front-end output processing provides a synchronization strobe to the NICAM processing with timing derived from integer divisions of a single system clock.

* * * * *